United States Patent

[11] 3,591,805

| [72] | Inventor | Dietmar M. Schoeffel<br>Hillsdale, N.J. |
|---|---|---|
| [21] | Appl. No. | 801,126 |
| [22] | Filed | Feb. 20, 1969 |
| [45] | Patented | July 6, 1971 |
| [73] | Assignee | Schoeffel Instrument Corp.<br>Westwood, N.J.<br>Continuation-in-part of application Ser. No.<br>705,863, Feb. 25, 1968, now abandoned,<br>Continuation-in-part of application Ser. No.<br>710,402, Mar. 4, 1968, now abandoned. |

[54] THIN LAYER CHROMATOGRAPHIC PLATE HAVING PREADJUSTED SPECTRAL TRANSMISSIVITY AND EMISSIVITY AND PREADJUSTED OPAQUE AND NONOPAQUE INTERVALS
12 Claims, 12 Drawing Figs.

[52] U.S. Cl. .................................................. 250/71 R,
210/198, 250/71 T, 350/1, 356/51, 356/105
[51] Int. Cl. ............................................... G01n 21/20
[50] Field of Search .......................................... 250/71 T,
71.5; 210/31, 198; 350/1; 356/51, 105

[56] References Cited
UNITED STATES PATENTS

| 3,303,043 | 2/1967 | Halpaap et al. ............... | 210/198 (C) X |
| 3,352,221 | 11/1967 | Barron et al. .................. | 250/71 X |
| 3,477,950 | 11/1969 | Clement et al. ................ | 210/198 (C) X |

*Primary Examiner*—James W. Lawrence
*Assistant Examiner*—Morton J. Frome
*Attorney*—Samuelson & Jacob ABSTRACT: A chromatographic plate wherein the spectral transmission is preadjusted and which is provided with preadjusted transparent and opaque intervals.

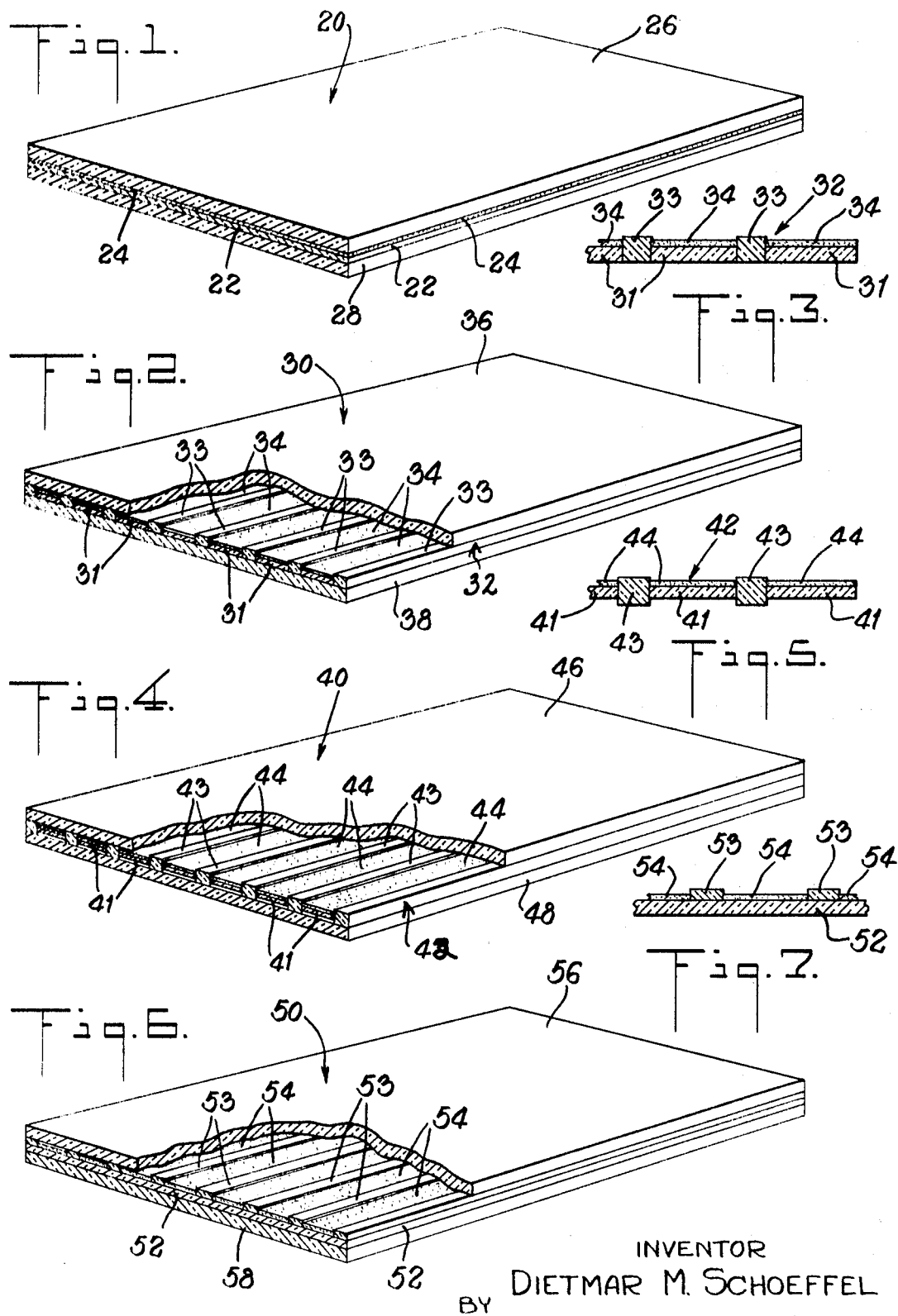

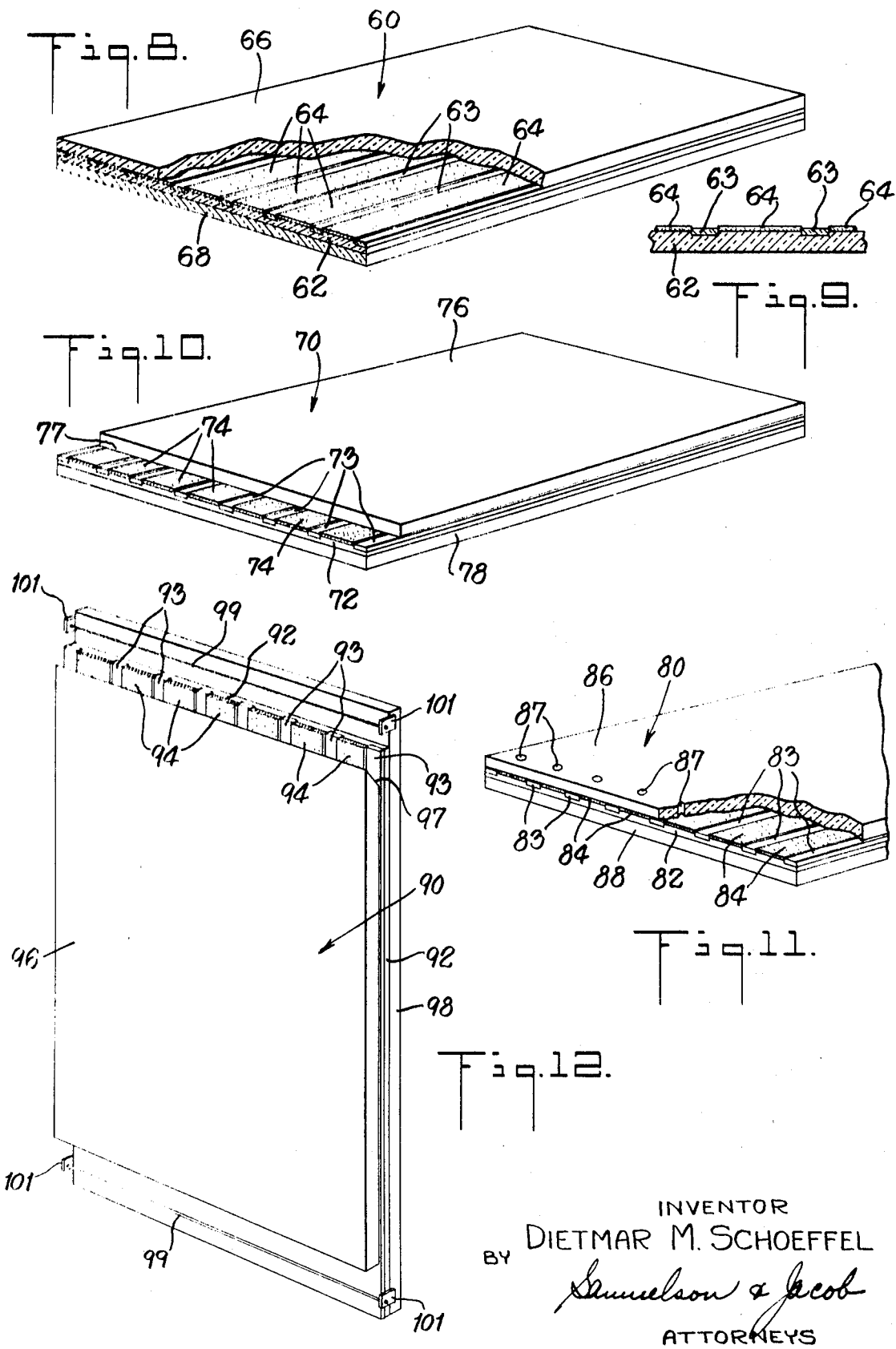

THIN LAYER CHROMATOGRAPHIC PLATE HAVING PREADJUSTED SPECTRAL TRANSMISSIVITY AND EMISSIVITY AND PREADJUSTED OPAQUE AND NONOPAQUE INTERVALS

This application is a continuation-in-part of my copending, now abandoned application Ser. No. 705,863, filed Feb. 25, 1968, and Ser. No. 710,402, filed March 4, 1968.

The invention relates to thin layer chromatographic plates and in particular to those chromatographic plates which have preadjusted spectral transmissivity and emissivity and preadjusted opaque and nonopaque intervals.

Thin layer chromatographic plates and sheets presently available are normally carrier plates made of plastic, glass or other suitable material covered with a layer of silica or other suitable adsorbent medium. Usually, the adsorbent is applied in slurry form and dried. Frequently, the adsorbent layer contains imbedded phosphors which are adsorbents and emitters and are interspersed in the adsorbent to promote better visibility under ultraviolet light.

Present thin layer chromatographic techniques are used in the diagnosis and analysis of various human and animal ailments as well as in organic and inorganic chemistry. The technique involves the separating of a compound or mixture of compounds to be analyzed into a plurality of individual compounds which are contained in the sample. The compound mixture, to be analyzed, is spotted at a point of origin near the edge of the plate and the plate is exposed to a solvent. The solvent is adsorbed into the adsorbent layer and penetrates to the sample which has been spotted on the plate. The solvent then carries the sample through the adsorbent layer and separates the compounds contained in the sample. These compounds then migrate to different areas or elevations in the adsorbent layer. It is then possible to examine the sample by optical means and thereby determine the composition of the original compound mixture.

Adsorbents are normally applied in form of a slurry onto the carrier plates, and finely ground phosphors (such as are described in Luminescence of Organic and Inorganic Materials by Kallman and Spruch, published by John Wiley and Sons, Inc., 1962, at page 355 et seq.) are mixed into these slurries if the plates are supposed to be later used for quenching-type detection methods. This technique has definite state-of-the-art drawbacks since the phosphor particles tend to gravitate, and thereby an uneven distribution is very often encountered. This uneven distribution, of course, results in uneven phosphorescence during photoelectric investigation. Since this phosphorescence normally has to considered as a reliable background reference, great care has to be taken to prepare plates of this sort for application of the quenching method. The incident radiation, causing phosphorescing emission of the phosphors embedded in the adsorbent, is more or less absorbed by the sample compounds which migrated, indicating thus their location by a decreased level of fluorescent radiation—— in other words, the phosphorescence is partially quenching.

Since the degree of quenching or reduction in phosphorescence has to be measured against the phosphorescing background normally present in the phosphorescing adsorbent, it is quite obvious that this phosphorescence should be as uniform as possible to supply a reliable level of emission which can be used as a reference for quantitative measurements. This is particularly important since in some cases not only the adsorbent or the therein embedded phosphor is an emitter but also the compound itself may produce fluorescence emission of its own. In cases of this sort, where the levels between the signals obtained form background phosphorescence and signals obtained from emissions yielded by the separated compounds provide only a small signal difference, the possible error becomes severe if the phosphorescing background is not uniform.

If the two emissions, namely, the compound emission and the phosphor emission are equal in emitted energy but different in emitted wavelength, it is possible for a photoelectric detector to be unable to distinguish between the location of the adsorber and the fluorescer. This is particularly true if the detector's response has similar detection characteristics at the two wavelengths. In order to avoid these defects in detection when optical quenching is encountered, suitable filters are used either in front of the detector or in front of the light source.

It is in the nature of the migrating compounds to spread and, by doing so, to widen in appearance. This spreading results in a dilute spot, nonuniform and generally nonrepeatable in size, being formed during each development of a chromatogram.

Broadly, the invention is directed toward providing a chromatographic plate which does not require the use of external filters and in which the complete amount of the total quantity of compound in the migrated spots can be detected and compared instantaneously with a standard. This is accomplished by providing suitable filters (such as are described in Chapter XVIII of The Principles of Optics by Hardy and Perrin, published by McGraw-Hill Book Company, 1932) which transmit only the phosphorescence wavelength of the phosphor-doped adsorbent and do not transmit the fluorescence wavelength of the absorbing separating compound unless the fluorescence is at the same wavelength as the phosphorescence. Consequently, the true optical absorption of the compound will be subtracted out of the phosphor emission in the area under investigation and an addition of energy due to the presence of fluorescence in the same area will be prevented. Obviously, a large number of possible filter media may be employed to enhance the detectability of compounds separated by means of the chromatographic migratory process.

To facilitate the investigation of these chromatographic plates still further, a complete interception of the total quantity present in the migrated spots is essential and this is accomplished by providing alternating strips of opaque and nonopaque areas on the plate.

Accordingly, it is an important object of the invention to provide a chromatographic plate formed of fluorescent or phosphorescent material to which a thin adsorbent layer is applied.

It is a further object of the invention to affix suitable optical filters to the chromatographic plate.

It is a still further object of the invention to provide a chromatographic plate in which there are alternating opaque and nonopaque strips to limit the bleeding of the spots of the sample laterally across the plate and to facilitate optical separation of the strips for photoelectric measurements without possible cross scattering.

It is still a further object of the invention to provide a chromatographic plate which can be utilized for quenching without phosphor doping of adsorbents by means of the employment of a uniformly phosphorescing or fluorescing carrier plate.

It is a still further object of the invention to provide such a chromatographic plate in which it is easy to confine the application of the sample to a particular strip of the plate to thereby make it possible to obtain closely adjacent uncontaminated reference strips for optical ratioing.

It is a still further object of the invention to provide such a chromatographic plate for use in analysis by electrophoresis.

These and other objects, advantages, features and uses will be apparent during the course of the following description when taken in conjunction with the accompanying drawings, wherein:

FIG. 1 is a perspective view of a chromatographic plate of the invention;

FIG. 2 is a view similar to that of FIG. 1 showing one embodiment of the invention wherein the plate is provided with alternating opaque and nonopaque longitudinal strips;

FIG. 3 is an end elevation of a portion of the plate of FIG. 2 showing the strip separation in detail;

FIG. 4 is a view similar to that of FIG. 2 showing a further embodiment of the invention for obtaining alternating opaque and nonopaque longitudinal strips;

FIG. 5 is a view similar to that of FIG. 3 of the embodiment of FIG. 4;

FIG. 6 is a view similar to that of FIGS. 2 and 4 of a still further embodiment of the invention for obtaining alternating opaque and nonopaque longitudinal strips;

FIG. 7 is a view similar to that of FIGS. 3 and 5 of the embodiment of FIG. 6;

FIG. 8 is a view similar to that of FIGS. 2, 4 and 6 of a still further embodiment of the invention for obtaining alternating opaque and nonopaque longitudinal strips;

FIG. 9 is a view similar to that of FIGS. 3, 5 and 7 of the embodiment of FIG. 8;

FIG. 10 is a view similar to that of FIG. 2 showing means for facilitating the application of a sample and/or solvent to the plate;

FIG. 11 is a view of a portion of a plate of the invention showing a further embodiment of means for facilitating the application of a sample to the plate; and FIG. 12 is a view of a plate of the invention showing still further means for facilitating the application of a sample to a plate of the invention used in analysis by electrophoresis.

In the drawings, wherein, for the purpose of illustration, are shown preferred embodiments of the invention, the numeral 20 designates a chromatographic plate of the invention. Plate 20 is seen to comprise plate 22 which contains a fluorescing or phophorescing medium, adsorbent layer 24 which is applied to plate 22 and filter plates 26 and 28 (FIG. 1). Typical adsorbents are described on page 11 of *Thin-Layer Chromatography* (Second Revised and Enlarged Edition) by Randerath, published by Academic Press, 1966.

The filters 26 and 28 serve to enhance the detectability of the compounds which are separated by means of the migratory process. The selective filter media forming the filters 26 and 28 are selected such that the true optical absorption of the compound will be subtracted out of the phosphor emission in the area under investigation and any addition of energy due to the presence of fluorescence in the same location is prevented.

A great number of phosphorescent adsorbers can be combined with a great number of filter media to enhance the detectability of the compounds under study.

It is within the contemplation of the invention to include the selective filter media as part of the plate 22 or the layer 24 to thereby enhance or suppress optical quenching, light scattering or compound fluorescence. The chromatographic plates of the invention are now examined by standard photoelectric or spectrographic techniques.

In order to facilitate the quantitative determination of the migratory separations, especially by optical means, it is advisable to limit the area into which the compounds may migrate. If this limitation is carried out along the length of the plate, many advantages will accrue to the user.

In FIGS. 2 and 3 illustrating an embodiment of the invention, plate 30 is seen to comprise nonopaque strips 31 and optically opaque strips 33 which together form plate 32, adsorbent layer 34, and filter plates 36 and 38. Nonopaque strips 31 are similar in composition to plate 22. Opaque strips 33 are preferably formed of glass or plastic but they may be made of any suitable material.

The adsorbents forming the adsorbent layer 34 are applied between the opaque strips 33 to a depth below the upper edge of the strips 33.

Now, when sample compounds mixtures (such as are described in Randerath supra at page 14 et seq. and page 89 et seq.) are applied to the nonopaque strips 31, the compounds cannot migrate outside the confines of the strip 31 to which the mixture has been applied because of the strips 33. By thus confining the migration and keeping the compounds within predetermined fixed physical limits, better and fuller mechanical and optical interception may be attained.

The total migration can be intercepted by a light beam because the light beam can overilluminate the area by spreading into the opaque boundary strips. Since the opaque boundary strips do not present any light signal to the detector, all of the signal received by the detecting instrument will be governed by the migrated compound. If one does not use opaque strips, he must either underilluminate to prevent spillover into an adjacent area or obtain false indications from the adjacent area due to overillumination.

In FIGS. 4 and 5, chromatographic plate 40 is seen to comprise plate 42 (similar to plates 22 and 32) which is made up of nonopaque strips 41 and opaque strips 43, adsorbent layer 44, and filter plates 46 and 48. This embodiment is very similar to that of FIGS. 2 and 3, the only difference being that the lower edges of the opaque strips 43 protrude below the lower surfaces of the nonopaque strips 41 while in the embodiment of FIGS. 2 and 3, the lower edges of opaque strips 33 and the lower surfaces of nonopaque strips 31 are in substantially the same plane.

In FIGS. 6 and 7, chromatographic plate 50 is seen to comprise filter plates 56 and 58, plate 52 (similar to plate 22), strips 53 of opaque material applied to plate 52 to form alternating opaque and nonopaque strips thereon and adsorbent layer 54. The use of this embodiment of the invention is the same as that for the earlier described embodiments.

In FIGS. 8 and 9, plate 60 is seen to comprise fluorescent or phosphorescent plate 62 in which are embedded opaque strips 63, adsorbent layers 64 and filter plates 66 and 68. Even though layer 64 may overlie the opaque strips 63, the operating technique for this embodiment is the same as for the others previously described. Strips 63 may be applied to plate 62 photographically or mechanically.

If the strips 63 are applied photographically, it is preferred that plate 62 be formed of alternate transparent and opaque strips. After the adsorbent layer is applied over plate 62 in the manner previously described, the adsorbent material is scraped off the opaque strips. This may be done by a specially designed tool having scrapers spaced the appropriate distance apart or in any other manner. The only requirement is that the adsorbent material be removed from the opaque strips.

In FIGS. 10 and 11, there are illustrated two constructions for facilitating the application of the samples and/or solvents to the adsorbent layer. Plate 70 comprises plate 72 (similar to plate 22), opaque strips 73, adsorbent layer 74 and filter plates 76 and 78. Plate 76 is offset as shown at 77 so that it is easy to reach the strips of adsorbent layer 74 with a syringe to thereby control the application of the sample to the proper strip and to facilitate dipping of the plate into the solvent.

Plate 80 comprises plate 82 (similar to plate 22), opaque strips 83, adsorbent layer 84 and filter plates 86 and 88. Filter plate 86 is provided with openings 87 to facilitate the application of the samples of the adsorbent layer.

Plate 90 of FIG. 12 comprises plate 92 (similar to plate 22), opaque strips 93, adsorbent layer 94 and filter plates 96 and 98. Plate 96 is undercut as shown at 97 to facilitate application of the samples to the adsorbent layer. Tabs 101 and wires 99 are provided to permit the use of plate 90 in electrophoresis analysis of the samples by applying the necessary voltages and immersing the plate 90 in suitable solutions in a manner well known in the art.

While preferred embodiments have been illustrated and described, it is apparent to those skilled in the art that modifications are possible without departing from the spirit and scope of the invention.

I claim:

1. A chromatographic plate comprising:

a thin plate having a first surface and a second surface;

the thin plate being formed of a fluorescent or phosphorescent material which emits light upon being subjected to radiant energy;

a thin adsorbent layer applied to the first surface of the thin plate;

a plurality of opaque longitudinal strips interspersed on the thin plate to thereby provide a plurality of alternating opaque and nonopaque strips.

2. The invention of claim 1 wherein the opaque strips are formed of photographic material and are affixed to the first surface of the thin plate.

3. The invention of claim 1 wherein the thin plate contains optical filter material embedded therein.

4. The invention of claim 1 wherein the opaque strips are formed of rigid material such as glass or plastic.

5. The invention of claim 1 wherein the opaque strips are affixed to the first surface of the thin plate.

6. The invention of claim 1 including:
a thin plate, optical filter affixed to the first surface of the thin plate such that the adsorbent layer is between the thin plate and the thin plate, optical filter; and
access means associated with the thin plate, optical filter to permit ready access to a portion of the first surface of the thin plate to apply a sample and/or a solvent to the thin adsorbent layer.

7. The invention of claim 6 including a second, thin plate, optical filter affixed to the second surface of the thin plate.

8. The invention of claim 6 wherein the access means associated with the thin plate, optical filter comprises the end of the thin plate, optical being displaced from the end of the thin plate to thereby expose a small portion of the first surface thereof.

9. The invention of claim 6 wherein the access means associated with the thin plate, optical filter comprises a plurality of openings in the thin plate, optical filter.

10. The invention of claim 6 including means for applying an electrical voltage across the width of the thin plate.

11. The invention of claim 10 wherein the access means associated with the thin plate, optical filter comprises the end of the thin plate, optical filter being displaced from the end of the thin plate to thereby expose a small portion of the first surface thereof.

12. The invention of claim 10 wherein the access means associated with the thin plate, optical filter comprises a plurality of openings in the thin plate, optical filter.